June 20, 1961 S. A. PLATT 2,988,976
TIMING MECHANISM FOR CAMERA SHUTTERS
Filed Aug. 14, 1958 2 Sheets-Sheet 1

INVENTOR.
Stephen A. Platt
BY
Price and Heneveld
ATTORNEYS

United States Patent Office 2,988,976
Patented June 20, 1961

2,988,976
TIMING MECHANISM FOR CAMERA SHUTTERS
Stephen A. Platt, 1100 Fulton St., Grand Haven, Mich.
Filed Aug. 14, 1958, Ser. No. 755,082
7 Claims. (Cl. 95—55)

This invention relates to cameras in general, and more particularly to a timing mechanism for camera shutters.

The shutter of a camera is provided to control the period of time that the camera film is exposed to light rays. In photographing objects in motion it is important to minimize the exposure time to prevent a blurred image from being impressed upon the camera film. The choice of shutter speed is also dependent upon the lighting conditions which prevail. Since it is desirable to be able to photograph objects moving at any speed and under any given lighting conditions, it is important that a camera have a large range of shutter speeds. It is also important that there be precise means of controlling the shutter operating speed in order to properly cope with each situation as it arises.

In the past camera shutters have been provided with a variable tensioning means to draw the shutter across the diaphragm opening of the camera. Such tensioning means are not readily adapted to control. Only the more expensive cameras have what are considered reasonably accurate shutter speed settings. However, even the more expensive cameras could be greatly improved in this regard.

It is an object of this invention to teach a new, different and much improved means of controlling the operating speed of a camera shutter. This invention teaches the use of means for tensioning the shutter for rapid closing action and other means for damping the movement of the shutter in the course of its closing action.

It is another object of this invention to provide a more readily controllable shutter operating mechanism. This invention teaches damping the freedom of movement permitted the shutter. The damping means provided is much more readily and accurately controlled than any of the other means of shutter control.

It is an object of this invention to teach having the shutter plate of a camera provided with means engageable by a special escape mechanism which will control the closing speed thereof.

Still another object of this invention is to teach having an undulate or rack surface provided on the shutter plate and which is engaged by oscillatory means for regulating the closing speed of the shutter.

A still further object of this invention is to teach an economical structure for obtaining the benefits of this invention. The materials required are relatively inexpensive, no particularly expensive operations are necessary in their assembly of installation, and the structure taught may be provided as a separate subassembly which is readily mounted for intercooperation with the shutter mechanisms of the type presently known.

The aforementioned and other objects and advantages of this invention will be more apparent in the described and illustrated embodiment of this invention as hereinafter set forth.

The shutter operating mechanism of this invention is mounted within a light tight camera box. The housing for the shutter operating mechanism is disposed normal to the diaphragm opening for the lens of the camera. The housing is formed to include a guide track for the film, on the backside thereof, and has guide tracks for the shutter plate and blind shutter formed therewithin. The shutter plate is tensioned for travel from one end of the housing to the other for first opening and then closing the light passage formed through the housing to impress a pictorial image on the film. The blind shutter is operated by the shutter plate and serves to close the light passage through the housing as the shutter plate is being reset. Shutter release and return means are provided to actuate and reset the shutter plates.

Means for damping the movement of the shutter plate is mounted in the camera box between the housing member and the face of the camera. Such damping means is disposed for engagement with a rack surface provided on the shutter plate. The damping means comprises a pair of intercooperative spring wires having a damper slidable thereon. The ends of the wires are disposed to engage and provide a damping effect on the travel of the shutter plate. The damping member engaged with the spring wires controls their oscillation and thereby alters their damping effect on the shutter plate.

Figure 1:
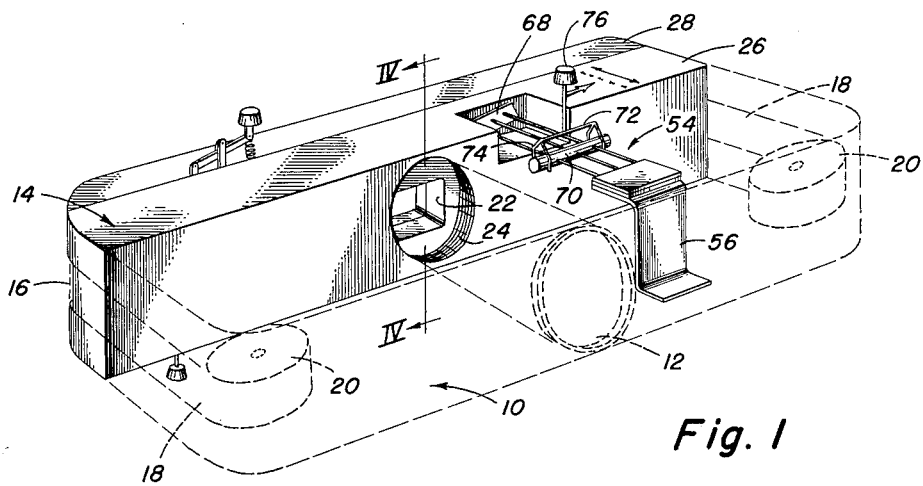
FIG. 1 is a perspective view of the shutter operating mechanism of this invention disposed within a camera shown in phantom outline.
Figure 2:
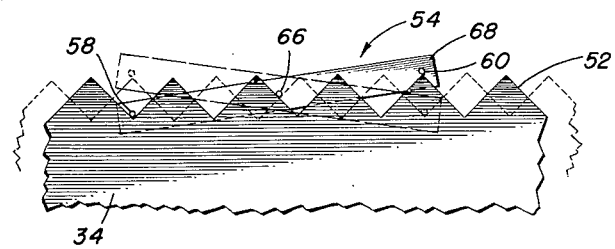
FIG. 2 is an enlarged fragmentary view of the shutter plate showing its rack surface and the end of the shutter damping means engaged therewith.
Figure 3:
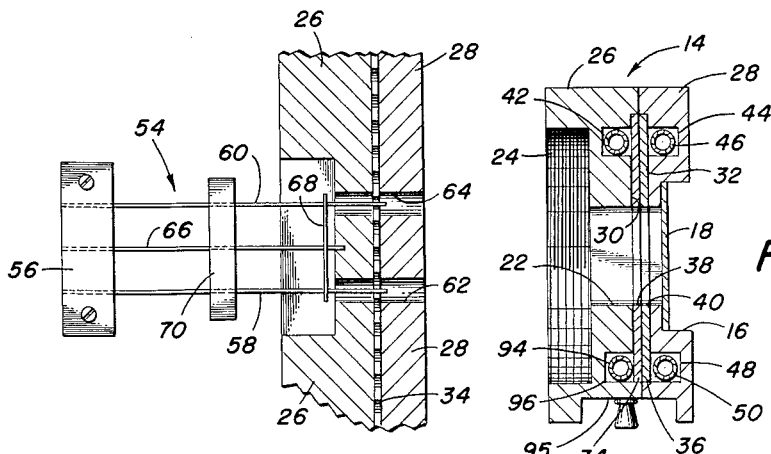
FIG. 3 is an enlarged top view of the shutter damping means shown in FIG. 1.

The light tight camera box 10 is shown in phantom outline in FIG. 1. A camera lens and diaphragm opening 12 is provided within the front face of the camera box. A shutter housing member 14 is disposed within the camera box 10. It extends across the camera box and normal to the lens opening 12. The housing 14 is formed to include a guide track 16 for the camera film 18. The guide track 16 is provided in the back side of the housing 14. The film 18 is wound on spools 20 disposed between the face of the housing 14 and the front of the camera box 10.

The shutter housing 14 is formed to include a passage 22 therethrough. The passage 22 is aligned with the diaphragm opening 12 and serves to expose the film 18 to the light image received through the diaphragm opening. The face of the housing 14 is formed to include a threaded recess 24 about the passage 22 for receiving the camera lens.

The housing 14 is formed in two parts 26 and 28. The housing parts 26 and 28 are secured together and have their adjacently disposed faces formed to include guide tracks 30 and 32 therebetween. The shutter plate 34 is received within guide track 30 and the blind shutter 36 is disposed within the guide track 32. The shutter plate 34 and blind shutter 36 include a light passage opening 38 and a cutaway 40 serving such purpose, respectively and are of a size and shape for alignment with the light passage 22 to permit exposure of the film 18 through the housing parts.

Passage grooves 42 and 44 are formed in the housing parts 26 and 28, respectively, and are in communication with the guide tracks 30 and 32, respectively. The shutter plate tensioning spring 46 is disposed within these passages. The shutter plate tensioning spring 46 has its ends engaged to one of the housing parts 26 or 28 as on pin 47 and is engaged with the shutter plate 34 intermediate its ends. The tensioning spring is mounted to draw the shutter plate 34 across the light passage 22 of the housing parts when released.

Passageway 48 is formed in the housing part 28 and is in communication with the guide track 32. A tensioning spring 50 is disposed within passageway 48 and is connected between the blind shutter 36 and one of the housing parts to tension the blind shutter for travel in the same direction as the shutter plate 34.

The upper edge of the shutter plate 34, near one end, is formed to include a saw tooth or rack surface edge 52. The undulating edge 52 of the shutter plate 34 is engaged by damper means 54.

The damper means 54 is mounted between the face of the camera box 10 and the housing 14. It includes a mounting bracket 56 secured to the base of the camera box 10 and having parallel spaced spring wire members 58 and 60 mounted on the upper end thereof in the plane of the rack surface edge 52 of the shutter plate 34. The extended ends of the spring wires 58 and 60 extend through openings 62 and 64 formed through the housing parts 26 and 28 respectively. These access passages 62 and 64 are formed to expose the rack surface edge 52 of the shutter plate 34 for engagement by the spring wires 58 and 60.

A wire 66 extends from the bracket 56 between wires 58 and 60 and is engaged with the housing part 26. The free ends of the spring wires 58 and 60 are engaged together by a link 68 which is pivotal on the wire member 66. Member 66 thus serves as a pivotal axis. The member 68 serves to keep the free ends of the wires 58 and 60 properly spaced apart and cooperatively interengaged. Member 68 is extremely light in weight and has no material effect on the spring rate of the wires 58 and 60.

The spring wire members 58 and 60 are preferably of a known resilient character having a given frequency of vibration; such as piano wires. Their ends are disposed for engagement with the undulating or rack surface 52 of the shutter plate 34 and are disposed out of phase with such surface. The connecting link 68 maintains this spacing and permits one spring wire to pass over the crest or crown of a saw tooth surface 52 as the movement of the other spring wire is in or near the land between a pair of teeth. The oscillatory rate of the spring wires 58 and 60, as the rack surface 52 moves under them, is dependent upon their effective length. Further, the action of each spring wire 58 and 60 is interrelated to the other by the connecting member 68.

A damper 70 is pivotally and slidably disposed on the intermediate wire member 66, and in slidable engagement with the spring wires 58 and 60. The damper 70 receives the spring wires 58 and 60 therethrough. The damper is movable between the supported and free ends of the spring wires by an operating mechanism 72 shown in FIG. 1.

The operating mechanism 72 for the damper 70 is shown to include fingers 74 connected to an indicator 76 slidable in the direction of the spring wires and mounted for such operation within the top of the camera box 10. The fingers 74 impose no restraint upon the damping action of the damper member 70.

The purpose of the damper 70 is to control the seesawing oscillatory aciton permitted the spring wires 58 and 60 as the rack surface 52 of the shutter plate 34 moves thereunder, as will now be described.

The fundamental frequency of a spring wire which is supported at one end and has the other end disposed free, is inversely proportional to its length times a factor based on the resiliency of the wire and its mass. For a spring wire of uniform cross section, the heavier and longer it is the slower its frequency of vibrational movement; conversely, the shorter the wire, the faster its frequency of movement. A short wire is generally spoken of as being more "stiff" and less flexible than a wire of greater length.

Where the length of the spring wire is constant the "stiffness" of the wire may be varied by a weight slidable along the length of the wire. The farther the weight is from the supported end of the wire the more resistance there is to the freedom of movement normally afforded the free end of the spring wire. In other words, as with thicker wire, the more mass to be moved the slower is the frequency of vibration.

In the present instance, the movement of the rack surface 52 of the shutter plate 34 is in the plane of the free ends of the spring wires 58 and 60. If only a small effort is required to displace the ends of the spring wires from interference with the rack surface, the shutter plate 34 will close more rapidly than if more effort were required. Consequently, the position of the damper 70 on the spring wires 58 and 60, is determinative of the closing speed of the shutter.

The spring wires 58 and 60 are preferably of the type known as piano wires, as mentioned, because of their uniformity of cross section and their known frequency of vibration.

Before describing the shutter operation it is well to understand more of the structure and operation of the shutter mechanism.

Figure 5:
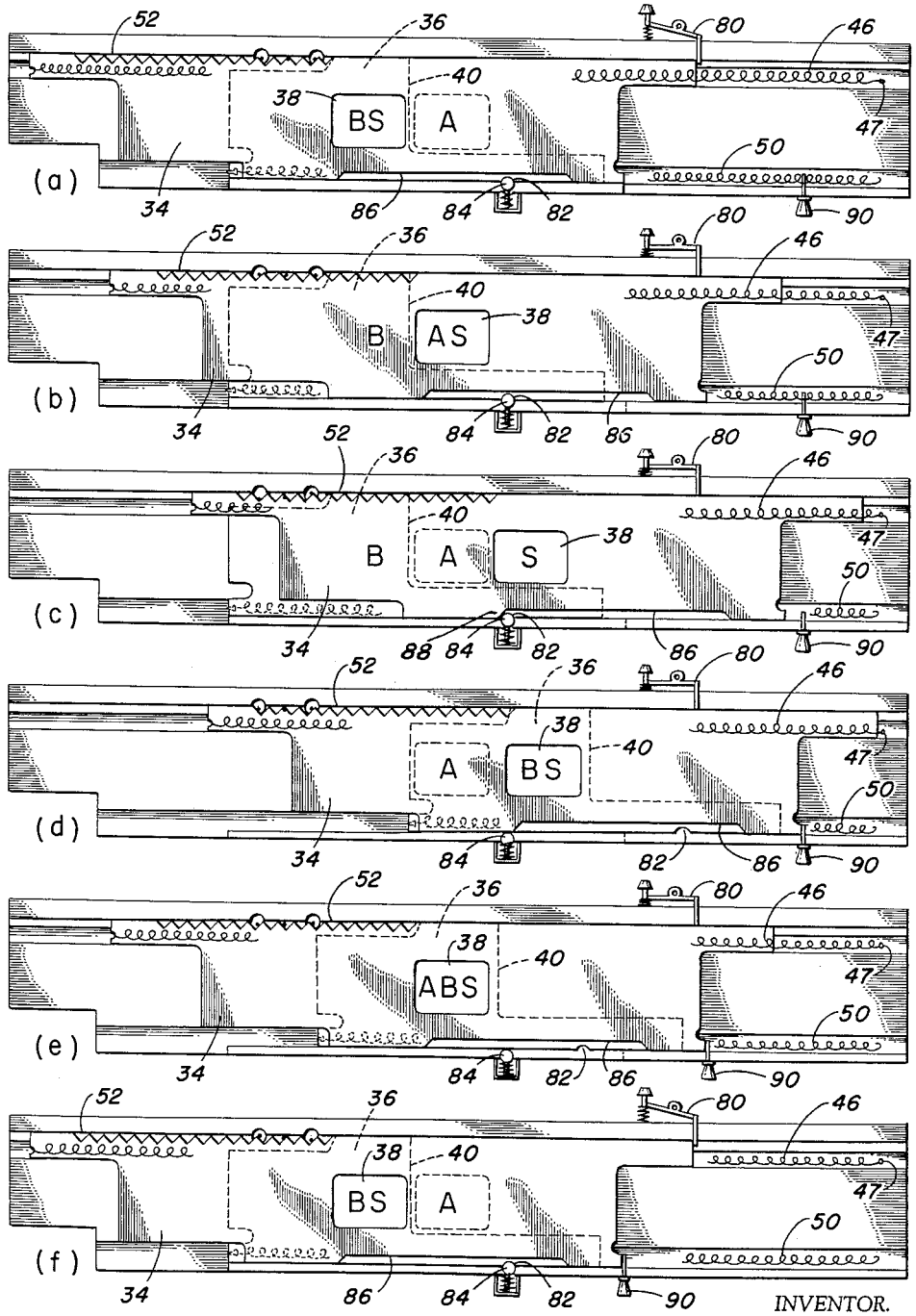
FIG. 5 is a diagrammatic illustration of the different shutter positions in the operation of a camera including this invention.

Referring to FIG. 5, and the sequential illustrations (a) through (f) thereof, the shutter plate will be seen to have one end formed for engagement by the tensioning spring 46 and the other end for engagement by a shutter tripping mechanism 80.

When the shutter plate 34 is under tension and the trigger mechanism 80 is engaged with its end, the shutter opening 38 (also identified as S) is displaced to one side of the light passage 22 (also identified as A). The blind shutter 36 has its tensioning spring 50 engaged with one end thereof and has the cutout portion 40, which defines the light opening for the passage of light rays therethrough (and is also identified as B), also offset to one side of the passage 22 when under tension.

The blind shutter 36 is provided with a detent recess 82 in its lower edge and has a detent member 84 mounted within the housing 14 and spring loaded for engagement within the detent recess 82. The shutter plate 34 is provided with a cutout 86 on its lower edge providing a shoulder 88 at one of its ends that depresses the detent 84 upon engagement therewith.

Figure 4:
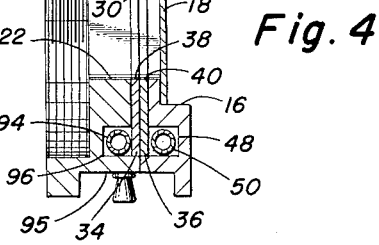
FIG. 4 is a cross sectional view through the shutter operating mechanism of FIG. 1 as seen in the plane of line IV—IV thereon.

A reset control 90 is mounted within the housing 14 for engagement with the ends of the shutter plate 34 and blind shutter 36, to enable resetting them in a spring loaded position. The reset control 90 may be biased to an inoperative position by a tensioning spring 94 disposed within a passageway 96 as is shown in FIG. 4 (but not shown in FIG. 5 to avoid confusion).

In FIG. 5(a) the shutter 34 is shown in a tensioned position with the trigger mechanism 80 engaged with the end thereof. The blind shutter 36 is also tensioned and held in such position by the detent 84. The reset control 90 is in an inoperative position.

When the trigger mechanism 80 is actuated, as shown by FIG. 5(b), the tensioning spring 46 pulls the shutter plate 34 across the housing opening 22. As the shutter plate opening 38 is aligned with the housing opening 22 light rays are admitted through the housing to the surface of the film 18 therebehind.

When the opening 38 of the shutter plate 34 has passed the light passage 22 in the housing, the shoulder 88 of its cutout portion 86 engages and depresses the detent 84 which holds the blind shutter 36.

As shown by FIG. 5(d), when the detent 84 has been depressed and removed from the detent recess 82, the blind shutter 36 is drawn rapidly across the light access 22 in the housing plates.

In resetting the camera, the reset control 90 is moved to the left, as shown in FIG. 5(e). This moves the shutter plate 34 and the blind shutter 36, together, back into their spring tensioned positions. The blind shutter 36 covers the opening 38 in the shutter plate 34, as the shutter plates are being returned, so that the light passage 22 is not exposed as the shutter plates are moved across such opening.

When the reset control 90 has returned the shutter plate 34 to the position shown by FIG. 5(f), the trigger mechanism 80 is automatically engaged with the end thereof, to hold it in its loaded condition. At the same time the detent 84 is reengaged within the detent recess 82 of the blind shutter plate 36 to hold it in its loaded position.

It will be noted in FIGS. 5(a) through (c), during which the shutter plate 34 is being actuated, that the rack surface 52 of the shutter plate travels under the ends of the spring wires 58 and 60 which are exposed through the openings 62 and 64 in the shutter housing.

Operation

The camera of this invention is operated in the same manner as other cameras. The subject to be photographed is sighted, the lens setting is made, the diaphragm opening is adjusted, and the shutter speed is selected. In selecting the shutter speed the indicator 76 is adjusted to move the damper 70 to a position on the spring wires 58 and 60 in accord with the desired shutter speed. Indicia of shutter speed is provided on the camera box 10 for such purpose.

When the shutter plate 34 is released by the trigger mechanism 80, the tension spring 46 moves the shutter plate rapidly across the light access 22 in the housing 14. The shutter plate 34 moves as rapidly as the damped spring wires 58 and 60 will permit. If the damper 70 is disposed near the mounting bracket 56 there is very little restraint on the shutter by the ends of the spring wires 58 and 60, as the rack surface 52 passes under them. In other words, the shutter plate 34 is able to take advantage of the faster oscillation permitted the wires 58 and 60 and to move more rapidly across the light access 22. However, if the damper weight 70 is disposed nearer to the free ends of the wires 58 and 60 the added mass reduces the spring rate of the wires and slows the travel of the shutter plate 34.

It will be appreciated that the speed of the shutter plate 34 is controlled by the mechanism 54 and that the tensioning spring 46 serves merely as a shutter plate actuator. Accordingly, the rate of the shutter plate travel is independent of the decreasing tension of the spring 46 and is dependent only upon the effect of the spring wires 58 and 60 as engaged with its undulating or rack surface 52.

The shutter plate 34 operates independently of the blind shutter 36 and, accordingly, the blind shutter imposes no restraint on the travel of the shutter plate 34. The shutter plate 34 does trigger the blind shutter's operation but only after its aperture opening has completely passed the aperture opening in the housing and does carry the shutter back to its loaded position, but it is independent of the operation of the blind shutter plate in closing the diaphragm opening.

Only the maximum speed of the shutter plate 34 is dependent upon the tensioning force of the spring 46. Variants in speed are provided by the resistance of movement imposed by the interference of the free ends of the spring wires 58 and 60 with the rack surface 52 of the shutter plate. The interference to free movement of the shutter plate 34, by the spring wires, is in turn dependent upon the freedom of movement of the wires themselves. Very little effort is required of the rack teeth to displace the spring wires themselves. However, the additional effect of the damper 70 on the wires, dependent upon its position relative to their free ends, will require a greater effort, dependent upon its location, and thereby impede the shutter movement to a known extent.

Unlike the conventional shutter operating tensioning springs, which have a diminishing effect on the rate of travel of a shutter plate as they are shortened, the spring wires 58 and 60 have a constant effect on the shutter plate throughout its travel.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A shutter operating mechanism for cameras, and comprising: a shutter guide having a light admitting opening formed therein, a shutter plate having a shutter aperture formed therein, means engaged with said shutter plate for reciprocating said shutter plate relative to said shutter guide to uncover and recover said light admitting opening, and speed controllable means including at least two vibrating members and an undulate surface associated with said shutter plate, the vibrating members each having a natural frequency of vibration and being arranged for operative engagement with said undulate surface with at least one vibrating member being engaged therewith at all times for damping the speed of shutter operation relative to said shutter guide, the natural frequency of vibration of said vibrating members controlling the operative engagement of said vibrating members with said undulate surface and thus the speed of said shutter.

2. A shutter operating mechanism for cameras, and comprising; a shutter plate having a shutter aperture provided therethrough, means for reciprocating said shutter plate normal to a light source, and separate means engaged with said shutter plate for damping the speed of operation of said shutter, said damping means including a rack with undulate surfaces provided on said shutter plate and a pair of interconnected and parallel spaced vibrating spring wires mounted and disposed to engage said undulate surfaces for cooperative interference with said rack, at least one vibrating spring wire being engaged with said undulate surface at all times and the natural frequency of vibration of said vibrating wires controlling the operative engagement of said vibrating wires with said undulate surfaces and thus the speed of said shutter.

3. A shutter control mechanism for cameras having a shutter plate mounted for movement laterally across a light admitting aperture provided in said camera, said control mechanism comprising; an undulate surface provided on said shutter plate, a support member disposed in spaced relation to said shutter plate, speed control means including at least two vibrating members each having a natural frequency of vibration and having one end secured to said support member and the other end disposed for engagement with said undulate surface for damping the speed of said shutter plate in its course of movement relative to said light admitting aperture, at least one vibrating member being engaged with said undulate surface at all times, and means engaged with said vibrating members and adjustable between said support and said shutter plate for regulating the vibration frequency of said vibrating members, the natural frequency of vibration of said vibrating members controlling the operative engagement of said vibrating members with said undulate surface and thus the speed of said shutter.

4. A shutter control device for cameras having a shutter plate mounted for lateral movement across a light source, and comprising; a rack surface provided on said shutter plate, an escape mechanism disposed for engagement with said rack surface, said escape mechanism including a pair of oscillatory spring wire members having their ends interconnected for cooperative oscillatory movement relative to said rack surface, and means slidably engaged with said spring wires for varying the oscillatory movement thereof and the consequent freedom of lateral movement permitted said shutter plate.

5. A shutter operating mechanism for cameras, and comprising; a shutter guide having a light admitting opening provided therethrough a shutter plate and a shutter mask cooperatively interengaged and each having a shutter aperture formed therein, said shutter plate and mask being mounted on said guide plate for reciprocation relative thereto and across the face thereof, means engaged with said shutter plate for reciprocating said shutter plate relative to said shutter guide, a saw tooth edge formed on said shutter plate, a support having a pivot axle mounted thereon and a pair of spring wires mounted on each side of said pivot axle, said spring wires being disposed for engagement with said shutter edge, a damper slidably and pivotally mounted on said pivot axle and disposed for engagement with said spring wires for damping the vibrational movement thereof in the movement of said shutter edge thereunder, and an interconnection provided between said spring wires for coordinating the vibrational movements thereof, said interconnection being pivotally mounted on said pivot axle next adjacent the ends thereof disposed for engagement with said shutter plate.

6. A shutter operating mechanism for cameras, and comprising; a shutter guide having a light admitting opening formed therein, a shutter plate having a shutter aperture formed therein, means engaged with said shutter plate for reciprocating said shutter plate relative to said shutter guide to uncover and recover said light admitting opening, and speed controllable means including at least two vibrating members and an undulate surface associated with said shutter plate, the vibrating members each having a natural frequency of vibration and being arranged for operative engagement with said undulate surface with at least one vibrating member being engaged therewith at all times for damping the speed of shutter operation relative to said shutter guide, the natural frequency of vibration of said vibrating members controlling the operative engagement of said vibrating members with said undulate surface and thus the speed of said shutter; and means for varying the natural frequency of said vibrating members for varying the speed of said shutter.

7. In a camera having a shutter having a light admitting aperture therein, said shutter being adapted to regulate the quantity of light admitted thereto, an element biasing said shutter for movement in one direction, and means for controlling the speed of movement of said shutter, said means having an undulate surface and at least two vibrating members each having a natural frequency of vibration, the method of controlling the speed of movement of said shutter including the steps: engaging said undulate surface with said vibrating members; maintaining at least one of said vibrating members in engagement with said undulate surface at all times to dampen the movement of said shutter under the influence of said biasing element, adjusting the natural frequency of vibration of said vibrating members to produce a preselected degree of dampening of the movement of said shutter, releasing said shutter to travel under the control of said vibrating members.

References Cited in the file of this patent
UNITED STATES PATENTS

| | | |
|---|---|---|
| 2,412,559 | Bolsey | Dec. 17, 1946 |
| 2,495,224 | Bodlander | Jan. 24, 1950 |